Patented Aug. 4, 1936

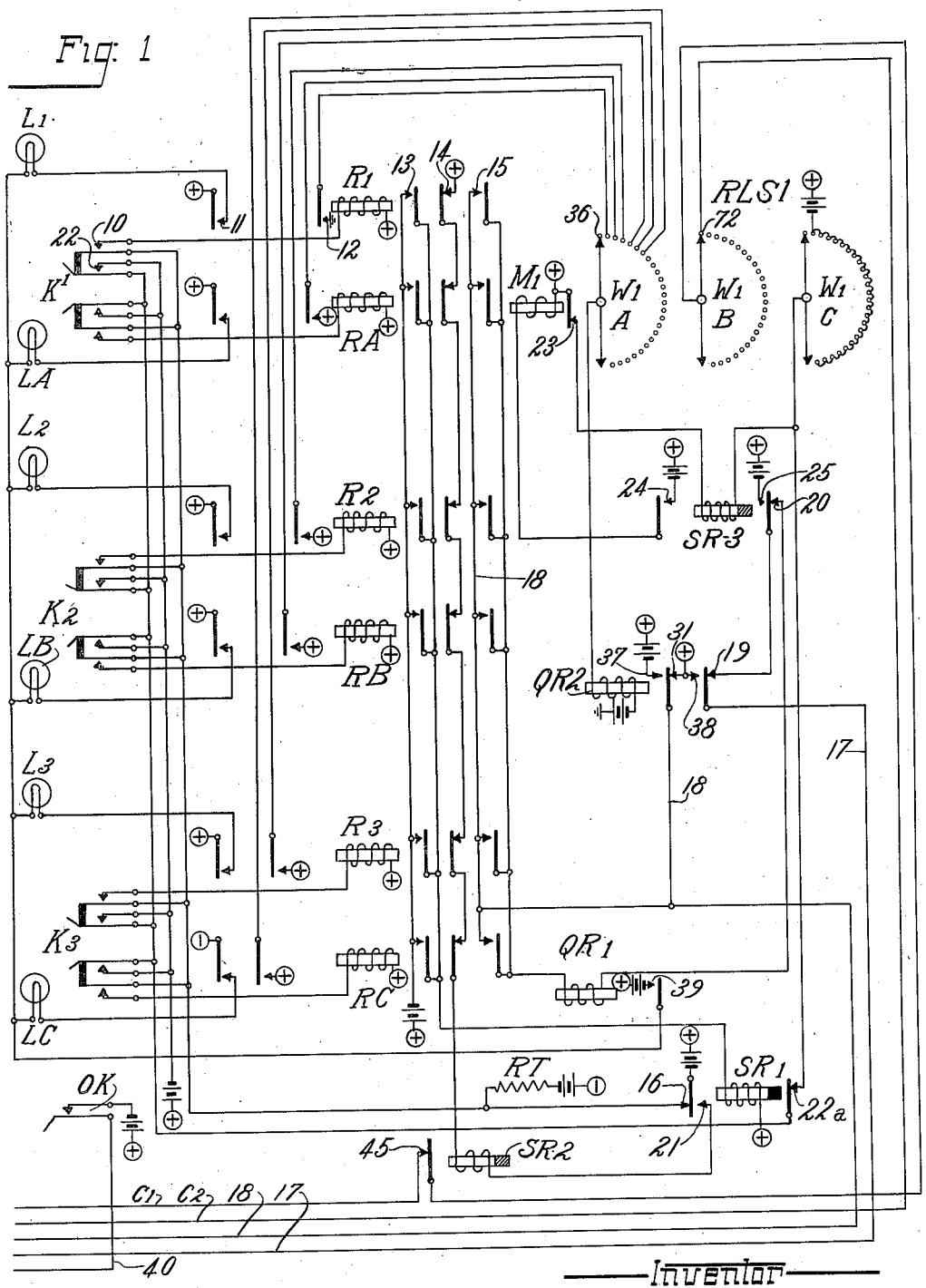

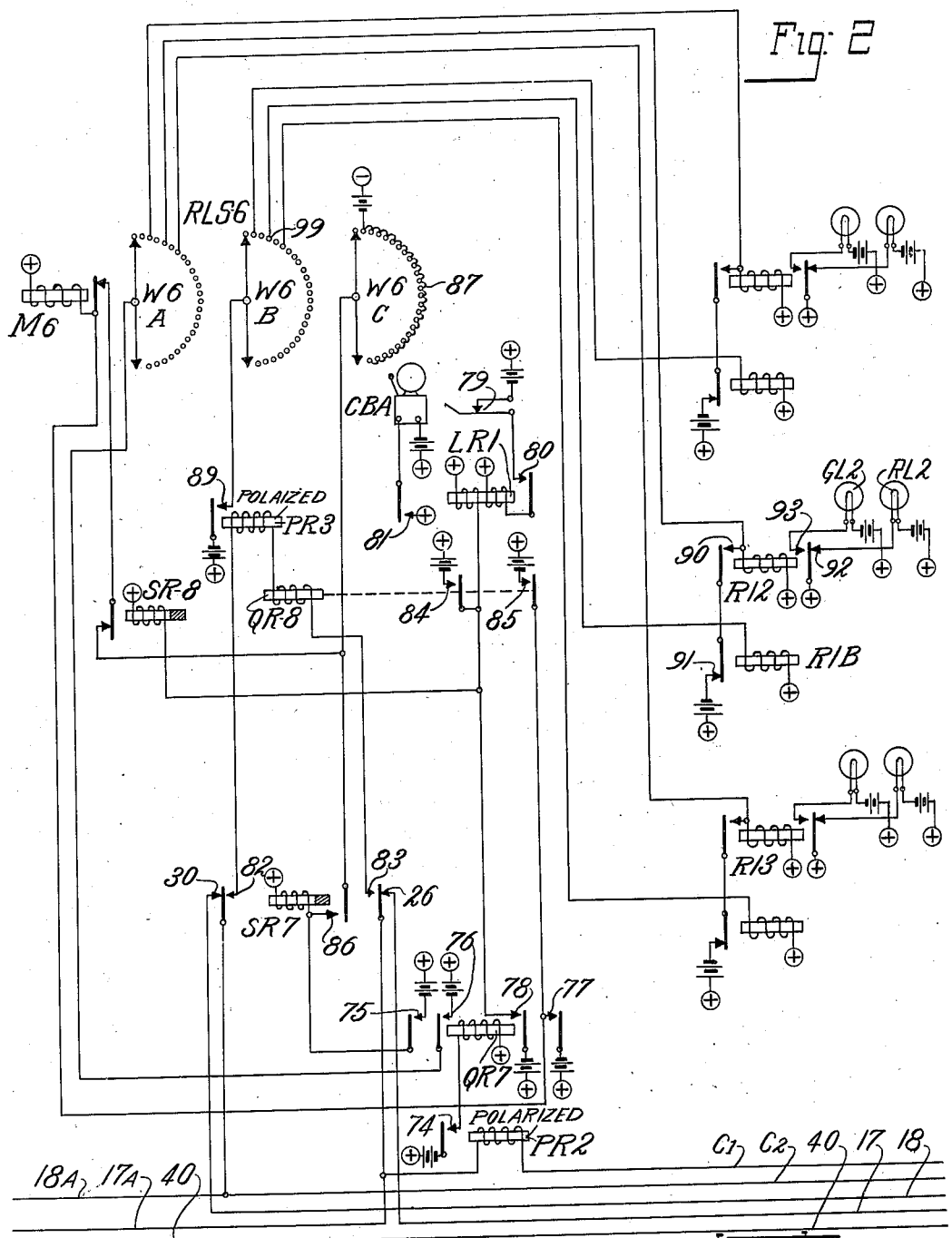

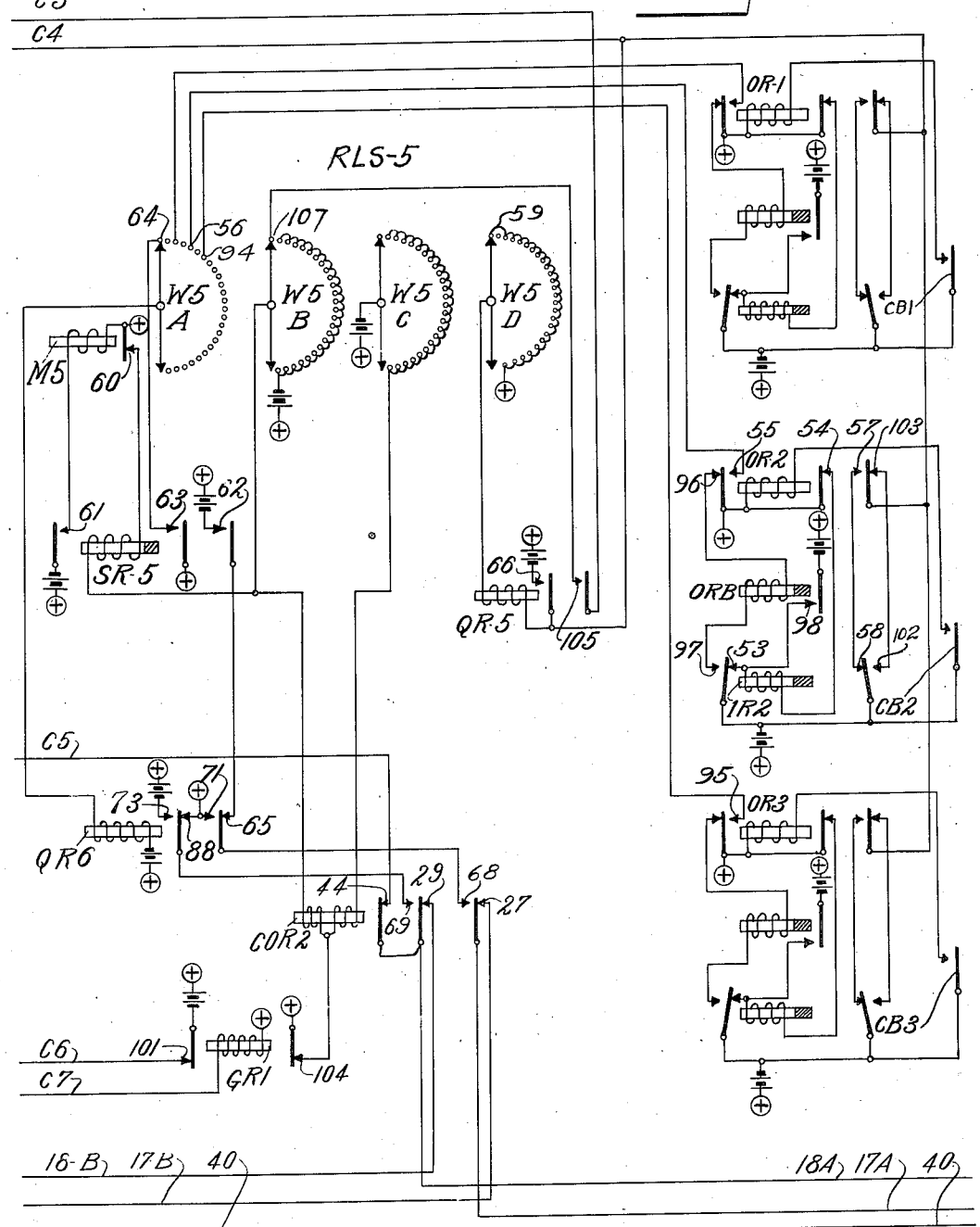

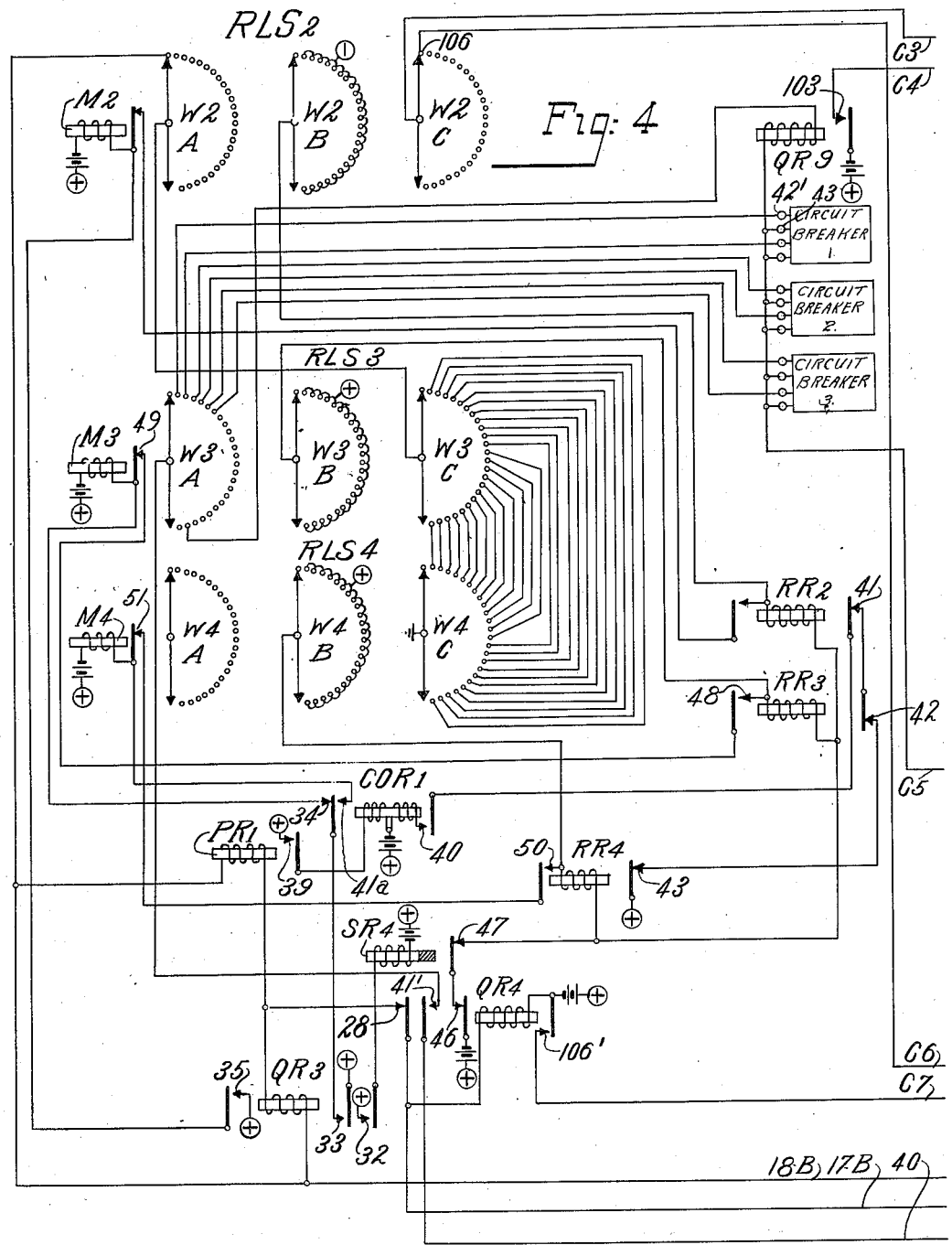

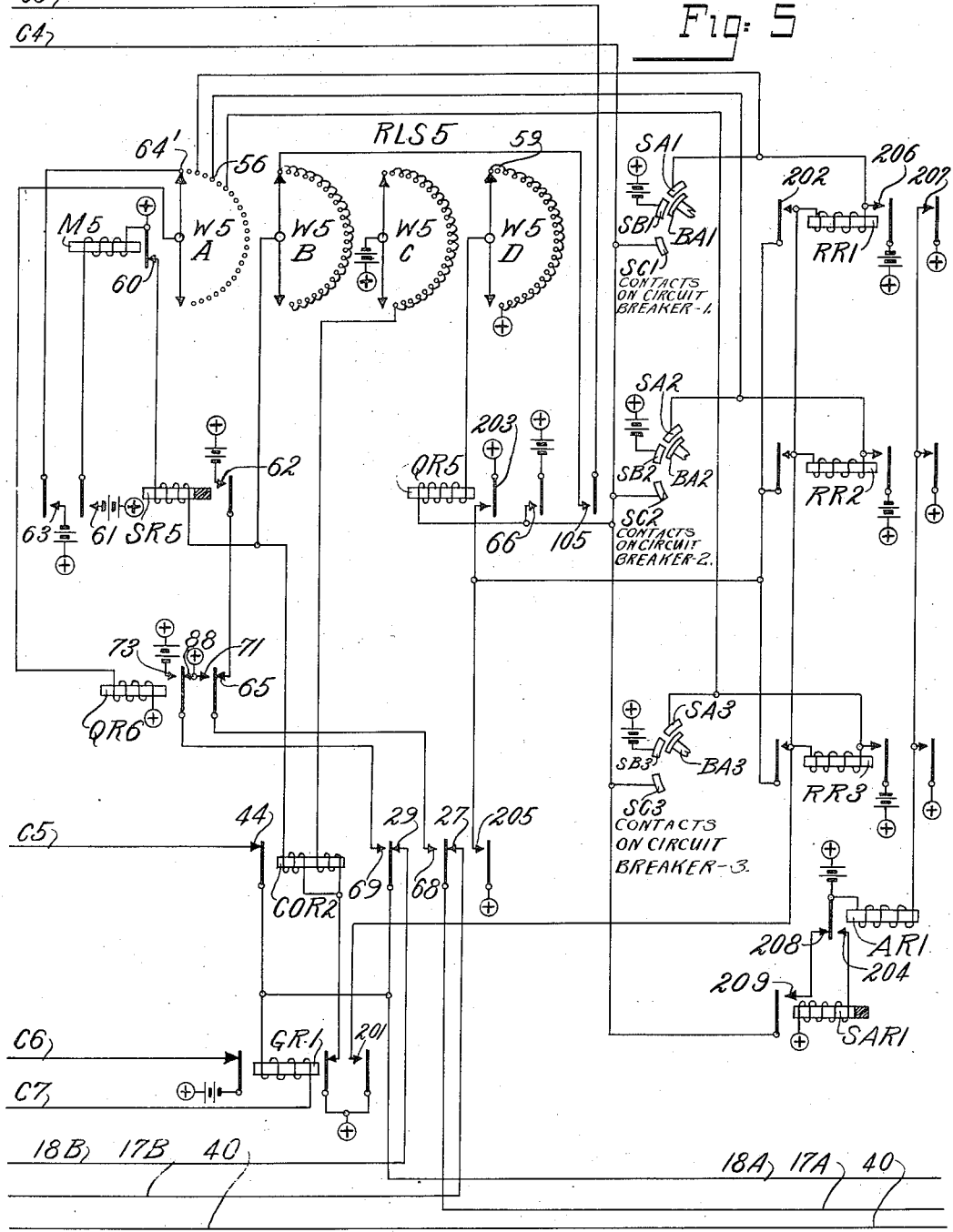

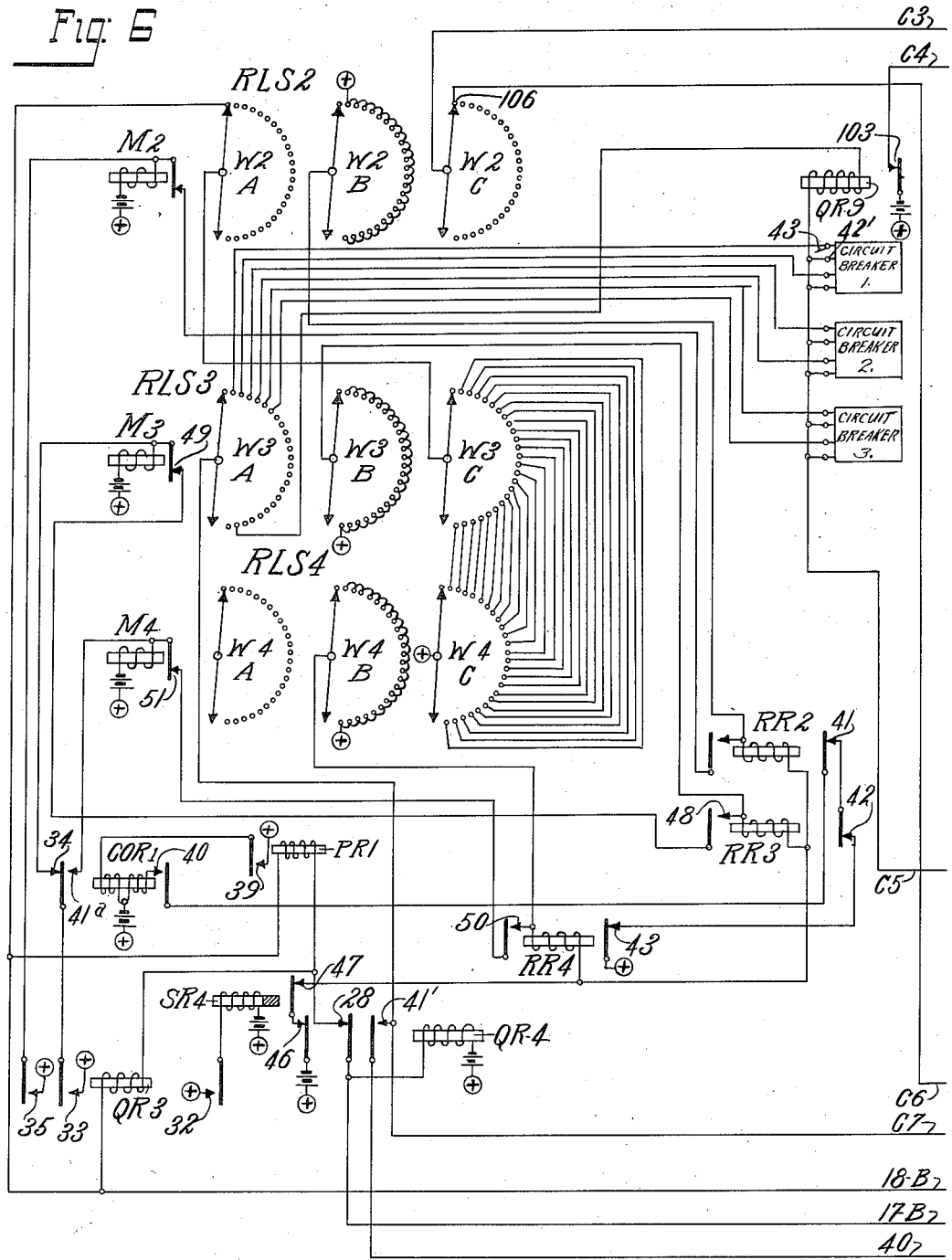

2,049,621

UNITED STATES PATENT OFFICE 2,049,621

REMOTE CONTROL SYSTEM

Charles Remington, Liverpool, England, assignor, by mesne assignments, to Associated Electric Laboratories, Inc., Chicago, Ill., a corporation of Delaware Application February 6, 1926, Serial No. 86,383
In Great Britain February 13, 1925

39 Claims. (Cl. 177—353)

The present invention concerns improvements in or relating to the control of apparatus at an electric power substation from a central control office. One object of the present invention is to provide improved controlling arrangements by which the number of control wires between the control station and the substation may be reduced to a minimum while at the same time allowing for the transmission of both selecting signals to determine apparatus to be operated, and checking and indicating signals to advise the attendant of the selected apparatus or of the operation of apparatus at the substation. In previous proposals for effecting the desired results, it has been necessary to employ separate circuits for selecting the apparatus to be operated and for checking the apparatus which has been selected.

One of the principal features of the present invention is that both these functions are performed over the same circuit, thereby enabling a separate circuit to be used for the control of the substation apparatus. Previously the selection of a particular apparatus has been checked by the transmission of a number of electric current impulses after the selection has taken place from the substation to the control office. It is important that the selection and subsequent checking should be accurate and it is a further object of the invention to provide improved arrangements for transmitting the signals from one station to another so as to ensure a greater accuracy and a more reliable operation of the system, while maintaining the apparatus required as simple and cheap as possible.

Another feature of this invention is the arrangement by which when the selection is made the restoration of the selecting devices to normal is controlled by current flowing continually over the line wires, so that an interruption of the current brings about the release. It is therefore possible for the attendant at the control station to either release the selected apparatus or to maintain it in its operated position to enable the desired operation to be effected.

Another feature of this invention is an arrangement for signalling the control station whenever an automatic operation takes place at the substation. Included in this feature is an arrangement for automatically checking the positions of all of the devices at the substation whenever one of them has been operated.

One form of the invention will be described by way of example with reference to the accompanying drawings. These drawings are identical with those in Patents 1,814,529 and 1,790,866, which patents cover different features as distinguished by the opening paragraphs and by the claims appended thereto. While the example illustrated refers to a direct connection between a central station and a control station, it should be understood that the invention is applicable to other conditions as will be readily understood by those versed in the art.

In the drawings Figs. 1 and 2 represent the apparatus at the central station, the apparatus shown in Fig. 2 being responsive to signals received from the substation while the apparatus shown in Fig. 1 is that used for controlling the apparatus at the substation, for instance putting in or pulling out circuit breakers, or for preparing circuits to enable meter readings to be taken or for other similar and other allied purposes.

In Figs. 3 and 4 which illustrate the apparatus at the substation, the apparatus shown in Fig. 4 illustrates the apparatus which responds to the selective action at the central station and serves to select the circuit breaker to be connected up or the allied circuit connection to be established, as desired by the attendant at the control station. The apparatus shown in Fig. 3 is that which responds to the coming out of the circuit breaker to give a signal to the control station and to indicate the position of the various circuit breakers.

Figs. 5 and 6 show an arrangement alternative to that in Figs. 3 and 4. In reading the drawings Fig. 1 should be placed at the right, Fig. 2 on the left, Fig. 3 to the left of Fig. 2 and Fig. 4 to the left of Fig. 3 in a straight line.

A description will first be given of the operation by which according to the invention a circuit breaker is put in at a substation under the control of the attendant at the control station. The apparatus shown is conveniently mounted on a panel on which will be visible keys K1, K2, K3, and associated therewith lamps L1, LA, L2, LB, L3, LC. The number of keys will correspond with the number of circuit breakers with an additional number according to the other operations it is desired to effect, such as the reading of a meter. The keys it will be noted can be moved either upwards or downwards so as to close the upper contacts or the lower contacts. Each of these movements corresponds to a different operation it is desired to effect, and the upward movement corresponds with putting a circuit breaker in, while the downward movement corresponds to pulling a circuit breaker out. For this reason the reference L followed by a numeral corresponds to the putting "in" of a circuit breaker, while L followed by a letter corresponds to the pulling of a circuit breaker "out". Associated with each key are a pair of relays which are given the references RI and RA and so on in a similar manner to LI, LA, so that the relays may be identified with the lamps with which they are associated. Assuming that it is desired to put circuit breaker No. 1 in, the key K1 is moved upwards, a circuit being completed for relay R1 as follows: positive pole of battery (represented by a plus sign within a circle throughout the drawings), relay R1, contact 10 of key K1, contact 16 of slow to release relay SR1 to negative pole of battery. At contact 22 key K1 closes a circuit as follows: negative pole of battery, contact 22, contact 22a, relay SR3, interrupter springs 23 of magnet M1 to positive pole of battery. Relay R1 energizes and effects the following circuit changes: at contact 11 it prepares a circuit for lamp L1, at contact 12 it connects positive pole of battery to the first contact 36 of rotary line switch RLS1, at contact 13 it completes a circuit for relay SR1 from positive pole of battery, relay SR1, contact 13 to negative pole of battery; at contact 14 it opens a point in the circuit of slow relay SR2, while at contact 15 it connects quick relay QR1 across the conductors 17 and 18 as follows: conductor 17, contact 19 of quick relay QR2, contact 20 of slow relay SR3, relay QR1, contact 15 of relay R1 to conductor 18. Relay SR1 at contact 16 removes the short circuit about resistance RT, which however is of such a value that relay R1 receives enough current through this resistance to be maintained energized although it cannot be energized initially in this circuit; closes a point 21 in the circuit of relay SR2 and at contact 22a opens the circuit of relay SR3. Relay SR1 is made sufficiently slow to pull up however to ensure that this circuit is not opened prior to the energization of relay SR3 in the circuit including contact 22 of key 1. Relay SR3 on energizing closes a circuit for the rotary magnet M1 of rotary line switch RLS1, at contact 24, while at contact 25 it connects negative pole of battery through contact 25, contact 19, conductor 17, contact 26, conductor 17A (leading to substation), contact 27, conductor 17B, contact 28, relays PR1 and QR3 in parallel, conductor 18B, contact 29, conductor 18A, (leading back to control station), contacts 30, conductor 18, contact 31 of relay QR2 to positive pole of battery. In this circuit relay QR3 energizes; with the current flowing in the direction described relay PR1 does not energize. QR3 brings about the following circuit changes; at contact 32 a circuit is completed from positive pole of battery, slow to release relay SR4 to negative pole of battery, at contact 33 a circuit is completed from positive pole of battery, contact 33, contact 34, magnet M3 of rotary line switch RLS3, negative pole of battery, while at contact 35 a circuit is completed from positive pole of battery, contact 35, magnet M2 of rotary line switch RLS2 to positive pole of battery. The rotary line switches RLS1, RLS2, RLS3, RLS4 are switches of the step by step type similar to those used in automatic telephone systems, having a plurality of wipers adapted to be moved round in a continuously forwards direction step by step over a bank of contacts by means of a ratchet mechanism. The wipers move in a single plane and advance on the de-energization of the motor magnets. It will thus be appreciated that the initial effect brought about by pressing the key K1 in an upwards direction at the control station is to bring about the energization of relay SR4 and the magnets M2 and M3 at the substation. At the control station the slow acting relay SR3 is only slightly sluggish so as to ensure that it will not de-energize due to the opening of the interrupter contacts 23 by the magnet M1 before the magnets M2 and M3 at the substation have been properly energized. In other words SR3 is just rendered sufficiently sluggish to ensure that the impulses transmitted under the control of the automatic operation of the rotary line switch RLS1 will not be too fast to properly and accurately control the operation of the rotary line switches RLS2, RLS3, RLS4, at the substation. When relay SR3 falls back a short time after the energization of magnet M1 it opens the circuit of M1 which thereupon releases. At the same time it opens at contact 25 a circuit of relay QR3 which in turn opens the circuit of magnets M2 and M3. As a result the wipers of the switches RLS1, RLS3, RLS2 all advance one step with the result that the wiper W1A advances to the first contact and thereupon a circuit is completed as follows: positive pole of battery, contact 12 of relay R1, first contact 36 in the bank of wiper W1A, that wiper, quick relay QR2 to negative pole of battery. QR2 energizes and opens contacts 19 and 31 and closes contacts 37 and 38, whereby the current over the conductors 17 and 18 is sent in the reverse direction. At the same time the wiper W1C advances on to the first bank contact which is multipled to all the other bank contacts and connected to the negative pole of battery, so that a circuit is completed for SR3 as follows: negative pole of battery, contact bank and wiper W1C, relay SR3, interrupter springs 23 which close when the magnet M1 de-energizes to positive pole of battery. The reversal of battery over the leads 17 and 18 causes the relay QR3 to energize and this time also the relay PR1. The relay PR1 completes a circuit for the cut off relay COR1 as follows: positive pole of battery, contact 39, right hand winding of relay COR1 to battery. Relay COR1 energizes and at contact 40 completes a locking circuit for itself as follows: negative pole of battery, left hand winding of relay COR1, contact 40, contact 41, contact 42, contact 43, to positive pole of battery, while it opens contact 34 and at contact 41a connects up the magnet M4 in place of the magnet M3 whose circuit was opened at 34. Consequently the relay QR3 in energizing this time completes a circuit for magnet M4, instead of magnet M3, the other operations are the same, the relay SR4 is arranged to be sufficiently slow that it will not release in between successive operations of relay QR3 during the series of impulses. The rotary line switch RLS3 therefore rests with its wipers on the first contact thereby giving an indication of the contact marked on the rotary line switch RLS1. As described the energization of relay SR3 closes at contacts 24 the circuit for magnet M1 which again energizes and opens contact 23, whereupon the circuit of relay SR3 is opened and this relay de-energizes so permitting the magnet M1 to de-energize and the wipers W1A, W1B, W1C to pass to the second position. When this occurs the circuit of relay QR2 is opened at contact 36 and this relay de-energizes so that on the next impulse the direction of current flowing over the conductors 17 and 18 will be in the same direction as that first described. Relay SR3 energizes again as soon as contact 23 closes in the circuit including wiper W1C and the pulse thus sent over the conductors 17 and 18 causes the relay QR3 to pulse the magnet M2 and magnet M4. The transmission of impulses then occurs automatically in the manner just described until the wiper W1C reaches the normal position when no further circuit can be completed for the relay SR3. By this time assuming a bank of 25 contacts, 25 impulses will have been sent over the conductors 17 and 18. These 25 impulses will have operated the magnet M2 25 times so that the rotary line switch RLS2 will be, or should be in its normal position. The rotary line switch RLS3 owing to the magnet M3 only having received one impulse will have its wiper resting on the first contact, while the rotary line switch RLS4 having received the remaining 24 impulses will have its wipers resting on the 24th contact. Provided that all these switches have taken up the position mentioned which will have occurred if the impulses have been transmitted correctly and no false impulse has been received at any time during the transmission due to stray currents on the line, the following circuit will have been completed: positive pole of battery, wiper W4C on the 24th contact, wiper W3C on the 1st contact, wiper W2A in normal position, conductor 18B, contact 29, conductor 18A, contact 30, conductor 18, contact 15, relay QR1, contact 20, contact 19, conductor 17, contact 26, conductor 17A, contact 27, conductor 17B, relay QR4 to negative pole of battery. In this circuit relays QR1 and QR4 energize in series. Relay QR4 opens contact 28 and contact 46, closing contacts 41' and 106'. At contact 106' a circuit is completed for guard relay GR1 which energizes so long as QR4 is energized, and by opening contacts 101, 104, prevents signals being transmitted in the opposite direction until the completion of the operation at the control station. Relay QR1 completes the following circuit: negative pole of battery, contact 39 of relay QR1, lamp L1, contact 11 to positive pole of battery. Lamp L1 thereupon lights thus signifying to the attendant at the control station that the three switches RLS2, RLS3, and RLS4 have operated correctly, i. e. RLS2 to make a complete revolution and RLS3 and RLS4 to set their wipers on contacts which are complementary to one another. This having been effected the attendant at the control station can now effect the putting in of the circuit breaker. To do this he presses the operating key OK which completes a circuit as follows: negative pole of battery, contacts of key OK, conductor 40, contact 41' of relay QR4, wiper W3A and the 1st contact engaged thereby to the conductor 42' of a pair of conductors, which lead to an operating magnet by which the circuit breaker is put in. The other conductor 43 is connected over contact 44 to lead 18A and thence over contact 30, lead 18, contact 31 to positive pole of battery. A circuit breaker of this type is shown in the Nelson Patent No. 1,765,538, filed November 16, 1921, for example circuit breaker CB4 of Fig. 5. In applying this circuit breaker to the system of my invention, lead 42 would be connected to lead 117 of Nelson, and the battery connected to the magnet 341 of Nelson would be replaced by lead 43. Consequently the operating magnet 341 of Nelson would be energized by the battery at the control station. It may be that the controller presses the wrong key K1, K2, K3, or operates the key in the wrong direction initially, if he does this it is checked at once by the lamp lighted, and he will therefore not operate the key OK, but restore the operated key, thereby releasing the relay R1 and opening the circuit of QR1 and QR4 at contact 15. These relays both de-energize as also a short time after does the relay SR1 whose circuit is opened at contact 13. Relay SR2 is momentarily operated through back contact 14 of relay R1, back contacts of all the other relays Ra, R2, R3, RC, winding of relay SR2, contact 21 of relay RS1 to negative pole of battery. Relay SR2 momentarily opens contact 45 to open the circuit of the polarized relay PR2, the purpose of which is to keep open the circuit of this relay for a sufficient time to ensure that the apparatus has returned to normal. The de-energization of relay QR4 in conjunction with the de-energization of relay SR4 which has followed shortly after the relay QR3 stopped receiving impulses from the central station, causes a circuit to be completed as follows: negative pole of battery, contact 46, of relay QR4, contact 47 of relay SR4 and the following circuits in parallel: release relay RR4, wiper W4B, 24th contact of the multipled bank engaged by this wiper to negative pole of battery; also release relay RR3, wiper W3B first contact of the multipled contacts engaged by this wiper to positive pole of battery. Relays RR3 and RR4 both energize in this circuit, and complete the following circuits: RR3 at contact 48, completes a circuit as follows: positive pole of battery, wiper W3B, contact 48, interrupter springs 49, magnet M3, to negative pole of battery. Magnet M3 is thereby energized and as it interrupts its own circuit and in view of the fact that the contacts engaged by W3B are all multipled together except in a normal position, wipers W3A, W3B, W3C are all automatically stepped to normal position. When this occurs the energizing circuit for relay RR3 is broken at wiper W3B and releases. A similar result is brought about by relay RR4 which at contact 50 completes a circuit through the positive pole of battery, 24th multipled contact, wiper W4B, contact 50, interrupter springs 51, magnet M4, to negative pole of battery. Magnet M4 thereupon operates to bring the wipers W4A, W4B, W4C to a normal position, whereupon relay RR4 deenergizes. The energization of relays RR3 and RR4 at contacts 42 and 43, opens the locking circuit for relay COR1, which accordingly de-energizes and hence everything at the control station has been restored to normal in readiness for the transmission of a fresh signal. It will be clear that the restoration of the keys depressed to normal either before or after an operation has taken place causes the switches to restore to normal in the same way as in the circuit described as this circuit is not dependent upon the circuit completed by the key OK, relay QR4 which determines whether the operation is to be effected or not being held up entirely under the control of the operating keys K1, K2, K3 at the control station.

It should be noted that a direct circuit extends from lead 40 and lead 18 to any of the pairs of conductors. Consequently if it should be desired to take a meter reading or to take any other observation or perform any other operation which could be effected over two conductors from a distance in view of this circuit being a clean circuit this could be done by simply connecting a pair of leads similar to C1 to the apparatus which requires to be operated or observed.

If for example it was desired to ascertain the load upon conductors 1 and 2 of Fig. 1, of the Patent 742,681, issued to Laird, October 27, 1903, the apparatus in the dotted square to the left of Fig. 1 of this patent would be connected across a pair of conductors such as 42 and 43A, while at the dispatcher's office the telephone D would be connected across the conductors 40 and 18. In other words conductors 40 and 18 would replace conductors 3 and 4 of the Laird patent. When it was desired to ascertain a load upon the power leads 1 and 2, the equipment would be stepped around so that wiper W3A of the switch RLS3 encounters the contact to which conductor 42 is connected, the operating key OK would be momentarily depressed to start the mechanism in the dotted square A1 of Laird and the impulses delivered by that mechanism would be audible in the receiver of the telephone D. The operation of the key OK would correspond to the momentary closure of the switch E to connect the battery C across the leads 34 of Laird. Thus by way of example it will be seen how telemetering can be applied to the system of my invention.

A description will now be given of the manner in which the attendant at the control station is notified of the coming out of a circuit breaker. Associated with each circuit breaker is a pair of contacts represented by CB1, CB2, CB3. If the circuit breaker C1 corresponds to the breaker CB4 of Nelson as mentioned heretofore, spring set CD1 is the set controlled by the armature leads 43 of Nelson, that is, armature CB1 corresponds to armature 343. When the circuit breaker falls out the contact is closed and hence a circuit is completed; assuming that circuit breaker No. 2 falls out, a circuit is then completed as follows: negative pole of battery, contact CB2, relay OR2 to positive pole of battery. It should be mentioned that normally while the circuit breaker is in, relay IR2 is energized and locked energized in the following circuit: negative pole of battery, contact 53, winding of relay IR2, contact 54, positive pole of battery. Consequently when relay OR2 energizes on the circuit breaker coming out, contact 54 is opened and the locking circuit for relay IR2 opened, so that this relay will fall back shortly afterwards. At contact 55 relay OR2 connects the positive pole of battery over contact 55 to the fifth contact of the bank wiped over by wiper W5A of the rotary line switch RLS5, at contact 57 a circuit is momentarily closed as follows until the relay IR2, falls back; negative pole of battery, contact 58, contact 57, relay QR5, normal contact 59 of the bank contacts wiped over by wiper W5D of the rotary line switch RLS5, wiper W5D to positive pole of battery. Relay QR5 thereupon energizes and is locked energized over contact 66, while at contact 105 it completes a circuit for relay SR5 as follows: negative pole of battery, contact 101, wiper W2C of rotary line switch RLS2, normal contact 106, contact 105, normal contact 107, wiper W5B of rotary line switch RLS5, relay SR5, interrupter contact 60 to positive pole of battery. A branch of this circuit extends over the left hand winding of cut-off relay COR2 to positive pole of battery. It will be appreciated that these circuits can only be completed when the rotary line switch RLS2 is at normal and relay GR1 deenergized. Relay COR2 energizes and at contacts 27, 29 and 44 disconnects the leads 18A, 17A, respectively from the conductors 18B, 17B, and the multipled lead connected to conductor 43, and connects leads 17A and 18A at contacts 68 and 69 to contacts controlled by relay QR6. Relay SR5 on energizing brings about the following circuit changes: at contact 61 completes a circuit from negative pole of battery, magnet M5 to positive pole of battery, thereby energizing magnet M5. At contact 62 it prepares a point in a circuit which, however, is of no effect at this time, and at contact 63 it connects positive pole of battery through the normal contact 64 and wiper W5A, relay QR6 to negative pole of battery. Relay QR6 on energizing completes a circuit as follows: positive pole of battery, contact 71, contact 68, lead 17A, polarized relay PR2, contact 45, wiper 41B, normal contact 72 of rotary line-switch RLS1, conductor 18A, contact 69, contact 73 to negative pole of battery. Relay PR2 energizes and closes the following circuit: negative pole of battery, contact 74, relay QR7 to positive pole of battery, relay QR7 energizes and brings about the following circuit changes: At contact 75 it completes a circuit for slow release relay SR7 as follows: negative pole of battery, contact 75, winding of relay SR7 to positive pole of battery: at contact 76 negative pole of battery is connected to wiper W6B of the rotary line switch RLS6, at contact 77 negative pole of battery is connected to magnet M6, and thence to positive pole of battery: at contact 78 a circuit is completed from negative pole of battery, contact 78, left hand winding of relay LR1 to positive pole of battery, while a branch of this circuit extends through slow release relay SR8, to positive pole of battery. Relay SR8 thereupon energizes; relay LR1 locks itself energized in the following circuit; negative pole of battery, contacts 79 of alarm bell key, contact 80 right hand winding of relay LR1 to positive pole of battery, while at contact 81 relay LR1 completes a circuit from negative pole of battery through circuit breaker alarm CBA through contact 81 to positive pole of battery, thereby sounding an alarm and calling the attention of the attendant at the main station that a circuit breaker has come out. Relay SR7 on energizing opens contacts 26 and 30 thereby breaking connection between conductors 17 and 18 and 17A and 18A, and connects conductors 18A and 17A at contacts 82 and 83 together by a circuit including the polarized relay PR3, and relay QR8. Relay PR3, however, does not energize at this time as it responds to current flowing in the opposite direction to that to which relay PR2 responds. Relay PR2, however, remains connected up in parallel to the series circuit including relays QR8 and PR3. Relay QR8 energizes and completes a circuit for SR8 at contact 84 in parallel to that previously described over contact 78, while at contact 85 it completes a circuit for magnet M6 in parallel to that over contact 77.

Returning to the operation at the sub-station it will be remembered that magnet M5 had energized, the effect of this energization is to open the interrupter contacts 60, whereupon the relay SR5 de-energizes shortly after, which opens the circuit of magnet M5, thus permitting the wipers W5A, W5B, W5C, W5D to advance one step. At the same time a circuit through QR6 is opened at contact 64 and the circuit extending over the conductors 17A and 18A is opened at contact 71, and at contact 83 thereby allowing relays PR2 and QR8 to deenergize, whereupon the circuit for magnet M6 is opened and the wipers of the rotary line switch RLS6 advance one step, thereby completing a locking circuit for relay SR7 as follows: positive pole of battery, winding of relay SR7, contact 86, wiper W6C, multipled contacts 87 to negative pole of battery, so that this relay is maintained energized as long as the wipers W6A, W6B, W6C are in an off normal position. Relay SR8 being slow to release, remains energized as long as impulses are being transmitted. The closing of contact 60 when magnet M5 de-energizes at the substation causes the relay SR5 to again energize whereupon the current impulse in the opposite direction to that previously described is transmitted over the conductors 18A and 17A. This circuit may be traced as follows: negative pole of battery, contact 62, contact 65, contact 68, conductor 17A, contact 83, relay QR8, relay PR3, contact 82, conductor 18A, contact 69, contact 88 to positive pole of battery. Relay PR2 is also excited by this current in the branch circuit previously traced, but only relay PR3 energizes with current in this direction. Relay QR8 also energizes and gives another pulse over contact 85 to magnet M6. Shortly after relay SR5 deenergizes allowing the magnet M5 to release also QR8 and PR3, consequently M6 releases and the wipers of the switches RLS5 and RLS6 advance a second step. If circuit breaker No. 1 was out at this instant, relay QR6 would energize over wiper W5A, third contact of bank contacts of relay OR1 to positive pole of battery, but in the present description it will be assumed that it was in. If it was out the same conditions would arise up to a certain point as occurs when circuit breaker No. 2 comes out. The difference occurs if circuit breaker No. 1 has come out and been recorded prior to circuit breaker No. 2 coming out, in which case No. 1 of itself would be unable to initiate the transmission of signals again. The two switches thus operate in unison until the 5th contact 56 is reached by wiper W5A. When this occurs a circuit is completed for relay QR6 as follows: positive pole of battery, contact 55, contact 56, wiper W5A, relay QR6, to negative pole of battery. Relay QR6 energizes and opens contacts 88 and 65 closing contacts 73 and 71 thereby reversing the direction of current flow over the leads 18A and 17A. This reversal of current while still permitting the energization of QR8 and the consequent stepping of the wipers W6A, W6B, W6C also energizes relay PR2; the polarized relay PR2 energizes relay QR7 which in turn completes the following circuit: negative pole of battery, contact 76, wiper W6A in fifth position, relay RI2, to positive pole of battery. Relay RI2 energizes and at contact 90 locks energized in the following circuit: negative pole of battery, contact 91, contact 90, relay RI2 to positive pole of battery while at contact 92 it opens the circuit of the red lamp RL2 which was lit indicating that the circuit breaker was in, thereby extinguishing it and lighting a green lamp GL2 over contact 93. The generation of impulses continues, but no more signals will be given unless other circuit breakers have come out. If other circuit breakers should have come out, for instance circuit breaker 3, then when wiper W5A reaches the seventh contact, a circuit will be completed for relay QR6, over seventh contact 94, contact 95, to positive pole of battery. Reversal of current over the line will again take place, relay PR2 will be again energized and relay RI3 would pull up, and also show a green lamp. Relay QR5 would have its circuit opened at wiper W5D after the switch RLS5 had made its first step. This relay would therefore de-energize and would not energize again unless another circuit breaker fell out in the meanwhile. If another circuit breaker fell out in the meanwhile, that is while the rotary line switch RLS5 was rotating, relay QR5 would receive a momentary impulse as previously described from the relays associated with the circuit breaker which has come out and would lock up at contact 66 and W5D until a second revolution had begun and wiper W5D stepped on the second contact, and the effect of this relay locking up would be to ensure that the rotary line switch RLS5 would make a second revolution so as to repeat the signals just given, and ensure that a signal was given of the circuit breaker which has come out second, as it may be that when it came out the signaling position might have been passed. It should be mentioned that relays SR5 and COR2 after the first impulse were energized in a circuit over the multipled contacts wiped over by wiper W5B to negative pole of battery.

It will now be assumed that the circuit breaker CB2 is put in by the operator at the control station in the same manner as described in connection with the putting in of circuit breaker CB1. In this case, however, instead of operating K1 the key K2 would be moved in an upwards direction. When the circuit breaker CB2 is inserted, contact CB2 opens and relay OR2 de-energizes, whereupon a circuit becomes momentarily completed as follows: negative pole of battery, contact 102, contact 103, relay QR5, wiper W5D in normal position, contact 59, to positive pole of battery, so that the initiation of the operation of the switches RLS5 and RLS6 is started as previously described: relay SR5, relay COR2 and relay QR6 being operated also. The relay OR2 upon de-energizing completes a circuit for relay ORB as follows: positive pole of battery, contact 96, relay ORB, contact 97 to negative pole of battery. Relay ORB energizes and completes a circuit for relay IR2 as follows: positive pole of battery, contact 54, relay IR2, contact 98, to negative pole of battery. IR2 energizes and locks energized over the following circuit: negative pole of battery, contact 53, relay IR2, contact 54, positive pole of battery, and at contact 102 opens the momentary circuit previously described for starting the switch RLS5. At this time however when the wiper W5A passes over the 5th contact, no circuit will be completed for the relay QR6. Consequently there will be no circuit for the relay RI2, but a circuit will be completed for the relay RIB as follows: negative pole of battery, contact 89 (relay PR3 being energized) wiper W6B, 4th contact 99, relay RIB to positive pole of battery. Relay RIB energizes, opens the locking circuit of relay RI2 thereby causing this relay to deenergize, which at contact 92 completes a circuit for the red lamp RL2, the circuit of the green lamp GL2 being opened at 93. This change from a green to red lamp indicates to the attendant that the circuit breaker has been replaced. If the operator at the control station desires to have a check of the position of the circuit breakers he can do this by pressing a special key, not shown, so as to set the rotary line switch RLS3 on the 24th contact whereupon a circuit is established from lead 40 over contact 41' (relay QR4 being energized) wiper W3A, 24th bank contact winding of relay QR9, contact 44 to lead 18A, so that by pressing the operating key relay QR9 is energized in a similar manner to that described in the operation of putting in a circuit breaker. Relay QR9 on energizing completes a circuit over contact 103, relay QR5 to the normal contact 59 of switch RLS5 so as to set the rotary line switches RLS5 and RLS6 in operation in the manner previously described. The full sequence of operations proceeds as previously described, and the position of all the circuit breakers will be checked and reset if necessary, so as to indicate the actual condition of the circuit breakers at the substation to the attendant at the control station. It will thus be appreciated that by means of the invention a very adequate check has been provided to ensure that only the correct operation is performed, the selecting operation being checked, and subsequently there being a check that the correct operation has actually taken place, while further this can be checked under the control of the attendant at any time he desires and any circuit breaker coming out at the control station is immediately recorded at the main station and and an alarm set in action which can only be restored to normal by operating the contact breaker alarm key 79 so as to release the relay LRI.

It will be noted that the invention as described insures that when a selecting signal is being transmitted a circuit breaker coming out should only be able to take control of the line when the rotary line switches have returned to normal, as otherwise a false indication of the positions of the circuit breakers may be given. It is considered desirable to provide this safeguard although the operator can always check the indications by the arrangement shown.

The arrangement described possesses the advantage that the notification of a circuit breaker coming out always prevents the line being used for a selecting or operating signal and this is very important in practice.

In Fig. 6 a somewhat modified arrangement is shown by which the relay QR4 does not complete a local circuit for the relay GRI at contact 106, but completes a branch circuit between lead 40 and the lead 18A, which may be traced as follows: lead 40, contact 41, conductor C7, relay GRI, (Fig. 5) conductor 18A. By making this relay GRI of very high resistance as is possible with the voltage used, the effect of this resistance will not in any way interfere with the operation of the selected apparatus, and further will not materially interfere with meter readings, or the like so that although the circuit between leads 18A and 40 does include the relay GRI, in view of the high resistance of this relay and in view of the fact that there is no battery or other local connection at the substation this does not interfere with the taking of meter readings, and for all practical purposes the circuit is "clean", especially as the meter readings to be taken will all be read by means of comparatively low voltages.

One advantage of this arrangement is that it enables a signal to be sent back to the central station if a circuit breaker has been put in without necessarily requiring the restoration of the selecting key to normal. This may be a very important feature, particularly where it is desired to take meter readings over a long period of time. It is again of value if an attendant for any reason should delay to effect the operation after effecting the selection.

In the prior arrangement shown in Fig. 4, relay GRI in conjunction with the wiper W2C prevented transmission of a signal from the substation to the control station until the complete operation had been completed at the central station. Now with the new arrangement the substation is enabled to take control automatically after the selecting signal has been sent and before the operating key has been pressed.

In Fig. 5 another modification is shown by which three relays individual to each circuit breaker are avoided and replaced by brushes and contacts controlled by the circuit breaker itself. For this purpose a brush arm BAI is caused to wipe over three segments SAI, SBI, SCI; when the circuit breaker No. I is in, SAI and SBI are connected together by the brush arm BAI thereby connecting negative pole of battery to the third contact wiper over by wiper W5A. Similarly circuit breakers Nos. 2 and 3 are provided with brush arms BA2 and BA3 and similar segments, SA2, SB2, SC2 and SA3, SB3, SC3. The arrangement at each circuit breaker is identical, therefore it will only be necessary to consider circuit breaker No. 1. If a circuit breaker comes out a circuit is momentarily completed for relay QR5 as follows: positive pole of battery, contact 59, wiper W5D, relay QR5, and a momentary connection between segment SCI and SBI. QR5 therefore energizes and locks energized and the initiation of the operation of the signalling of the position of circuit breakers is brought about as before. There are one or two slight alterations in the circuit of Fig. 5. For instance the winding of relay QR6 is connected to positive pole of battery instead of to negative pole of battery, and accordingly the connections of contact 63 are connected to negative pole of battery instead of positive. This avoids having both positive and negative poles of battery connected to contacts of the same relay which is desirable if at all possible. There is another slight modification which however will be described later.

It will thus be seen that the coming out of a circuit breaker causes a momentary connection to energize relay QR5 which is similar to what takes place with the relays of Fig. 3 which they replace. When the circuit breaker is put in however, in addition to the momentary contact to cause relay QR5 to energize, which of course occurs, irrespective of the direction in which the brush arm BAI is moving, a circuit is permanently closed connecting negative pole of battery from segment SBI over brush arm BAI, segment SAI to the third contact wiped over by wiper W5A, so that exactly the same conditions are brought about as by the relays. It will therefore not be necessary to describe this operation further.

In addition in Fig. 5 an arrangement is shown by which in the event of the attendant at the central station putting in a circuit breaker, he may receive a notification that he has put it in even if it should come out immediately afterwards due to a short circuit, or excessive loading. This, it will be appreciated, is of considerable importance in practice as otherwise with the arrangements previously described, the attendant would have no assurance that the first putting in of the circuit breaker has resulted in the circuit being put in and will not therefore be able to distinguish between the faulty operation of the selecting apparatus and the presence of a fault on the circuit controlled by the circuit breaker.

For this purpose a relay is provided per circuit breaker which of course would be an extra relay in the case where three relays are provided instead of the brush arm arrangement. These relays are denoted by the references RR1, RR2, RR3. The operation is as follows: When a circuit breaker is put in a circuit is completed as follows: negative pole of battery, segment SB1, brush arm BA1, segment SA1, relay RR1, contact 201 of relay GR1, to positive pole of battery. This is because relay GR1 will be energized at this instant, as the operating key will still be pressed. Relay RR1 therefore locks energized in the following circuit entirely independent of its original energizing circuit: negative pole of battery, contact 206, relay RR1, contact 202, contact 203 of relay QR5 to positive pole of battery. Relay QR5 is of course energized as previously described in the process of putting the circuit breaker in. Therefore each time a circuit breaker is put in, the relay RR1 will be energized, and locked energized in a circuit independent of the operating key and of the brush arms on the contact breaker. The operating key can therefore be restored to normal without effecting the relay RR1. In addition the relay RR1 at contact 206 completes a circuit from negative pole of battery to the third contact wiped over by wiper W5A, so that even if the circuit breaker immediately comes out, an indication would be given as if the circuit breaker was in. Again a circuit is closed for an auxiliary relay AR1 which is common to all the circuit breakers. This auxiliary relay AR1 operates and energizes a slow auxiliary relay SAR1, at contact 204. Relay SAR1 energizes and prepares a circuit to the segments SC1, SC2, SC3. Relay QR5 as soon as relay GR1 de-energizes, due to the operating key being restored to normal causes the rotary line switch RLS5 to make a complete half revolution, thereby signaling the position of the circuit breakers to the attendant. In this case of course, the circuit breaker will indicate that it has been put in. After the first step relay QR5 will de-energize but the relay RR1 will be maintained energized through contact 205 of relay COR2, which is in parallel with contact 203. Relay COR2 will of course de-energize when the wipers W5B and W5C reach the normal position. When this occurs relay RR1 will de-energize thereby removing negative pole of battery from the third contact wiped over by wiper W5A at contact 206, and opening contact 207 to permit relay AR1 to de-energize. Relay AR1 accordingly de-energizes and at contact 208 closes a circuit in series with contact 209 of relay SAR1 to cause relay QR5 to again energize, the circuit being completed over relay QR5, wiper W5D, contact 59 to positive pole of battery. Relay QR5 thereupon causes the rotary line switch RLS5 to make a second revolution, but this time the signal to be given to the attendant will be reversed as regards circuit breaker No. 1, and the circuit breaker will be indicated as having come out. Relay AR1 having opened the circuit of relay SAR1, contact 204, causes this relay to de-energize and open contact 209, so that the relays RR1, AR1, SAR1 have all returned to normal.

What is claimed is:

1. In a signal system, a control station and a remote station, a single circuit including conductors extending between said stations for selecting and checking purposes, a sender at the control station including means to transmit a constant number of impulses over the conductors of said circuit, a register at said remote station operated thereby, means in said sender operated to transmit predetermined numbers of impulses followed by an impulse of reversed polarity and second groups of impulses, means for transmitting a checking impulse back over the same conductors of said circuit only if the two series of impulses and said reversed impulse registered at the remote station equals the sum of the impulses in said constant number, and a checking signal at said control station operated responsive to the transmission of said checking impulse for indicating the correct registration of said impulses.

2. In a signal system, a control station and a remote station, a single circuit including conductors extending between said stations, a sender at the central station including means to transmit impulses over the conductors of said circuit, a register at said remote station operated thereby, means for operating said sender to transmit predetermined numbers of impulses followed by an impulse of reversed polarity and second groups of impulses bearing predetermined relationship to said first numbers, means for transmitting a checking impulse back over the same conductors of said circuit only if the sums of the numbers of impulses registered in the two series is a constant, and a checking signal at said control station operated in response to the transmission of said checking impulse to indicate the proper registration of said impulses.

3. In a signal system, a control station and a remote station, a circuit including conductors extending between said stations, a sender at the control station including means to transmit impulses over the conductors of said circuit, a register at said remote station, means for initiating a selective operation of said sender, means in said sender operated after a predetermined number of impulses have been sent to transmit an impulse of reversed polarity over said circuit to set said register, means for transmitting a single impulse back over the same conductors of said circuit a fixed number of impulses after the initiation of said selective operation only if said selection has been correctly registered and a checking means at said control station operated responsive to the transmission of said single impulse to indicate a correct registration.

4. In a remote control system, a control station and a remote station, a sender, means for initiating the pulsing operation of said sender to select a particular device in said remote station, means at the control station operated after a predetermined number of impulses have been sent to transmit an impulse of distinctive character to select said device, checking means operated after a fixed number of impulses have been sent by said sender to transmit a checking impulse from the remote station to the control station only if said selection has been accurate, a checking signal at said control station operated in response to the transmission of said checking impulse to indicate said selection, and means for preventing the extension of an operating circuit from the control station to said device if said checking means is not operated.

5. In a remote control system, a control station and a substation, a plurality of switching devices at said substation, selecting and checking switches at said substation, a sender at said control station, a trunk line between said stations, means for starting said sender from its normal position to transmit a code of impulses over said trunk to set said selecting switch in a predetermined position to select a particular one of said devices, means for holding said switch in said predetermined position, means for setting said checking switch in a predetermined position while said sender is returning to its normal position, and means for checking the setting of said switches over a loop circuit including said trunk, said switches in said predetermined positions and said sender in its normal position.

6. In a remote control system, a control station and a substation, a plurality of switching devices at said substation, selecting and checking switches at said substation, a sender at said control station, a trunk line between said stations, means for starting said sender from its normal position to transmit a code of impulses over said trunk to set said selecting switch in a predetermined position to select a particular one of said devices, means for holding said switch in said predetermined position, means for setting said checking switch in a predetermined position while said sender is returning to its normal position, means for checking the setting of said switches over a loop circuit including said trunk, said switches in said predetermined positions and said sender in its normal position, and means including said holding means for restoring said switches to normal without operating said selected device.

7. In a remote control system, a control station and a substation, a plurality of switching devices at said substation, selecting and checking switches at said substation, a sender at said control station, a trunk line between said station, means for starting said sender from its normal position to transmit a code of impulses over said trunk to set said selecting switch in a predetermined position to select a particular one of said devices, means for holding said switch in said predetermined position, means for setting said checking switch in a predetermined position while said sender is returning to its normal position, means for checking the setting of said switches over a loop circuit including said trunk, said switches in said predetermined positions and said sender in its normal position, means including said holding means for restoring said switches to normal without operating said selected device, means controlled by said checking means for preparing an operating circuit for said selected device, and means for operating said selected device over said circuit.

8. In a remote control system, a control station and a substation, a plurality of switching devices at said substation, selecting and checking switches at said substation, a sender at said control station, a trunk line between said stations, means for starting said sender from its normal position to transmit a code of impulses over said trunk to set said selecting switch in a predetermined position to select a particular one of said devices, means for holding said switch in said predetermined position, means for setting said checking switch in a predetermined position while said sender is returning to its normal position, means for checking the setting of said switches over a loop circuit including said trunk, said switches in said predetermined positions and said sender in its normal position, means including said holding means for restoring said switches to normal without operating said selected device, means controlled by said checking means for preparing an operating circuit for said selected device, means for operating said selected device over said circuit, and said trunk from a battery at said control station.

9. In a remote control system, a control station and a substation, a trunk line between said stations, switches at said substation, means for setting said switches by impulses transmitted over certain conductors of said trunk, the first of said switches being set in a position to make a predetermined selection and the other switch being set in a position complementary thereto to check the selection made, means for checking the accuracy of said setting by transmitting a single checking impulse over said certain conductors of said trunk line only if said switches have been accurately set in complementary positions in accordance with the total number of impulses transmitted, and a checking signal at the control station operated by said checking impulse to indicate the accuracy of said setting.

10. In a remote control system, a control station and a substation, a source of current at each of said stations, a trunk line between said stations, switches at said substation, means for setting said switches in complementary position by impulses transmitted over said trunk from said control station current source, the first switch being set in a position to make a selection and the second switch being set in a position complementary thereto to complete and check the selection made, means for checking the accuracy of said setting by a single checking impulse transmitted back over said trunk line from said substation current source to the control station only if said setting is accurate in response to the total number of impulses transmitted, and a checking signal at the control station operated in response to the transmission of said checking impulse to indicate the proper operation of said switches.

11. In a remote control system, a plurality of switching devices, selecting means for selecting any of said devices, a sender including a key for each switching device, an impulsing circuit, means responsive to the operation of one of said keys to start said sender to transmit the code of that switching device over said circuit to operate said selecting means into connection therewith, and means at said sender for checking the operation of said sender and selecting means, said checking means operated over a circuit including contacts on said key responsive means and said impulsing circuit.

12. In a remote control system, a plurality of switching devices, selecting means for selecting any one of said devices, a sender including a key for each switching device, an impulsing circuit, a relay responsive to the operation of one of said keys to prepare said sender to send a particular code and to start said sender to transmit said code over said circuit to operate said selecting means into connection with a particular switching device, and means at said sender for checking the operation of said sender and selecting means, said checking means operated over a circuit including contacts on said relay and said impulsing circuit.

13. In a remote control system, a plurality of switching devices, selecting means for selecting any one of said devices, a sender including a key for each switching device, an impulsing circuit, a relay responsive to the operation of one of said keys to prepare said sender to send a particular code and to start said sender to transmit said code over said impulsing circuit to operate said selecting means into connection with a particular switching device, means at said sender for checking the operation of said sender and selecting means, said checking means operated over a circuit including contacts on said relay and said impulsing circuit, and means for thereafter operating said selected switching device.

14. In a remote control system, a selecting device comprising three single motion step by step switches, each having a normal position, a sender including a similar step by step switch having a normal position, means for operating said sender to transmit a code of impulses to said selecting device to step said sender switch and the first of the said selecting device switches into their normal positions and to step the second and third selecting switches into positions corresponding to said code, and means in said sender for checking the positions of said second and third switches over a circuit including the normal positions of the other switches.

15. In a remote control system, a selecting device and a checking device, a sender, a trunk line between said sender and devices, means for starting said sender to transmit codes of impulses over said trunk to set said selecting and checking devices in predetermined positions, a signal lamp associated with said means, and means comprising a relay energized only if said devices have been set in said predetermined positions over a circuit including said trunk and said selecting and checking devices, to light said signal lamp.

16. In a remote control system, a pair of step by step selector switches, banks of contacts on said switches, wipers engaging said banks, multiple connections between certain of said banks connecting the contacts of the first to the contacts of the second banks in reverse order, means for operating said selector switches first to step the wipers of the first switch and then to step the wipers of the second switch to set said wipers on complementary ones of said contacts, a circuit extended through said wipers and complementary contacts, and a checking signal operated in response to the extension of said circuit for checking the position of said switches.

17. In a remote control system, a pair of step by step selector switches, banks of contacts on said switches, wipers engaging said banks, multiple connections between certain of said banks connecting the contacts of the first to the contacts of the second bank in reverse order, means for operating said selector switches first to step the wipers of the first switch and then to step the wipers of the second switch to set said wipers on complementary ones of said contacts, a relay energized over a circuit through said wipers if they are correctly positioned on complementary ones of said contacts, and a checking signal operated in response to the energization of said relay to indicate the accurate setting of said switches.

18. In a remote control system, a pair of step by step selector switches, banks of contacts on said switches, wipers engaging said banks, multiple connections between certain of said banks connecting the contacts of the first to the contacts of the second bank in reverse order, means for operating said selector switches first to step the wipers of the first switch and then to step the wipers of the second switch to set said wipers on complementary ones of said contacts, a checking circuit including said complementary contacts completed only if said switches are correctly set, and means including a checking signal operated in response to the completion of said checking circuit to indicate the correct setting of said switches.

19. In a selecting and checking system, a selecting device and a checking device, an impulsing circuit, means for transmitting a fixed number of uniform impulses over said circuit to operate said devices; means for separating said impulses into two groups by transmitting a reversed impulse, said selecting device operated responsive to each impulse of the first group to a selecting position and said checking device operated responsive to each impulse of the second group to a corresponding checking position, means for establishing a checking circuit including said impulsing circuit immediately after the last impulse of the second group if both of said devices have been correctly set in their respective selecting and checking positions in response to said fixed number of impulses, and a checking signal operated in response to the establishment of said checking circuit to indicate the correct setting of said devices.

20. In a remote control system, an impulsing circuit comprising an impulse sending switch and selecting and checking devices operated thereby, means for starting said impulse sending switch to send a series comprising a fixed number of impulses, and for preparing a control circuit over which said sender is operated to alter one of said impulses, means included in said impulsing circuit for operating said selecting device in synchronism with said sender, means also included in said impulsing circuit responsive to said altered impulse to stop said selecting device and to start said checking device operating in synchronism with the sender throughout the remainder of the series, a checking circuit completed immediately upon the termination of the last impulse of said series if said devices have been correctly positioned, and means including a checking signal at said sending switch operated in response to the completion of said checking circuit to indicate the correct positioning of said devices.

21. In a remote control system, a selecting switch and a checking switch each having banks of contacts and a wiper sweeping over said contacts, multiple connections between said banks connecting the contacts of the checking switch to the contacts of the selecting switch in reverse order, an impulsing circuit, a sender including means for stepping said selecting switch over said circuit by sending a number of impulses equal to the number of contacts in said bank, means in said sender for altering any one of said impulses, means responsive to the receipt of said altered impulse to remove said selecting switch from the control of said sender and to place said checking switch under its control, checking means in said sender operated immediately after the last impulse delivered by the sender over a circuit completed through said wipers and multiple connections if said switches have properly registered said impulses, and a checking signal at said sender operated in response to the operation of said checking means to indicate the correct registration.

22. In a remote control system, an impulsing circuit, a sender comprising a counting switch having a movable wiper and an impulsing device, selecting and checking devices, means for starting said sender to operate the selecting device over said impulsing circuit in synchronism with said sender, and for preparing a control circuit therefor, a reversing relay energized over said control circuit when said counting wiper encounters it to transmit an impulse of reversed polarity, a polar relay in said selecting device operated by said reversed impulse to disconnect the selecting device from said impulsing circuit and to connect said checking device thereto, a checking circuit completed by said selecting and checking devices jointly, after said sender has transmitted a fixed number of impulses if said devices have been correctly positioned, and means including a checking signal at said sender operated in response to the completion of said checking circuit to indicate the correct positioning of said devices.

23. In a remote control system, an impulsing circuit comprising an impulse sender switch and selecting and checking devices operated thereby, manual means for starting said sender to operate said selecting device over said impulsing circuit in synchronism with said sender and for preparing a control circuit therefor, means operated over said control circuit when said sender is in a predetermined position for transmitting a characteristic impulse, means in said selecting device responsive thereto for positioning said selecting device and starting said checking device in operation in synchronism with said sender, a checking circuit completed after said sender has transmitted a fixed number of impulses if said devices have been correctly positioned, and means including a checking signal at said sender operated in response to the completion of said checking circuit to indicate the correct positioning of said devices.

24. In a selective signalling system, a plurality of switching devices each having an in and an out position, a supervisory signal for each position of each of said devices, in and out control relays common to said signals, an out position relay individual to each of said devices and energized when that device moves to its out position, a sender associated with said devices, means for starting said sender responsive to the change in position of one of said devices to transmit a code of impulses, a selector operated by said impulses to associate said control relays with said signals in order, and means in said sender operated through association with an energized out relay to reverse the polarity of one of said impulses to operate said out control relay to position the signal corresponding to that device to indicate that the device is out.

25. In a selective signalling system, a plurality of switching devices each having an in and an out position, a supervisory signal for each position of each of said devices, in and out control relays common to said signals, an out position relay individual to each of said devices and energized when that device moves to its out position, a sender associated with said devices, a reversing relay in said sender, means responsive to a change in position of a device for starting said sender to transmit a code of impulses and to associate said reversing relay to said devices in order, said relay energizing when associated with an energized out relay to reverse the polarity of one of said impulses, means responsive to said impulses to associate said control relays with said signals in the same order, said out control relay operating on said reversed pulse to set the signal with which it is then associated to indicate that the corresponding device is out.

26. In a selective signalling system, a plurality of switching devices each having two positions, two signals for each of said devices, a control relay for each position, a pulsing relay, a trunk line, one of said control relays and said pulsing relay being bridged across said trunk in series, said other control relay being connected across said trunk in parallel with said series combination, means responsive to a change in position of one of said devices to transmit a code of impulses over said trunk each impulse operating said pulsing relay and one of said control relays, means controlled by said pulsing relays to associate said control relays with said signals in order, and means controlled by said control relays through said last means to set said signals to correspond with the positions of said devices.

27. In a remote control system, a dispatcher's station comprising a manually controlled sender for transmitting impulses and a supervisory switch, a substation comprising selecting and checking devices and an automatic sender for transmitting impulses, an impulsing circuit between said stations, means including said manually controlled sender for operating said selecting device by impulses transmitted over said circuit to make a selection and for thereafter operating said checking device by impulses transmitted over said impulsing circuit to check such selection, means including said automatic sender for operating said supervisory switch by impulses transmitted over said impulsing circuit, and means for preventing either of said senders from transmitting impulses over said circuit while the other sender is transmitting impulses over said circuit.

28. In a remote control system, a dispatcher's station comprising a manually controlled sender having a normal position, a substation comprising an automatic sender having a normal position, an impulsing circuit between said stations, means for starting either of said senders to seize said impulsing circuit and to transmit impulses thereover, and means including circuits through said normal positions for preventing the transmission of said impulses over said circuit by one sender if the other is off normal.

29. In a remote control system, a dispatcher's station comprising a manually controlled sender having a normal position and a supervisory switch, a substation comprising an automatic sender, an impulsing circuit between said stations, means including said manually controlled sender for transmitting impulses over said impulsing circuit, means operated responsive to the transmission of said impulses by said manual sender for preparing a starting circuit for said automatic sender, and means operated over said starting circuit when said manual sender returns to its normal position to start said automatic sender to operate said supervisory switch by transmitting impulses back over said impulsing circuit.

30. In a remote control system, a plurality of operating circuits, a selecting device having access thereto, checking devices, a trunk line, means for operating said selecting device and said checking devices over said trunk line to select an operating circuit, a checking circuit completed by the correct operation of said checking devices for checking the accuracy of said selection, means associated with said selecting and checking devices and operated in response to the completion of said checking circuit for extending a clean metallic circuit from said trunk line to said operating circuit, and means including a checking signal operated in response to the completion of said checking circuit for indicating the accuracy of said selection and the said extension of said metallic circuit to the operating circuit.

31. In a remote control system, a plurality of operating circuits, a selecting device having access thereto, checking devices, a trunk line comprising three conductors, means for operating said selecting device and said checking devices over a pair of the conductors of said trunk line to select an operating circuit, a checking circuit completed by the correct operation of said checking devices for checking the accuracy of said selection over said trunk pair, means associated with said devices and operated in response to the completion of said checking circuit for extending a clean metallic circuit from one of the wires of said trunk pair and the third wire of the trunk to said operating circuit, and means including a checking signal operated in response to the completion of said checking circuit for indicating the accuracy of said selection and the said extension of said metallic circuit to said operating circuit.

32. In a remote control system, a substation and a control station, a step by step switch at the control station, a pair of similar switches at the substation, means for operating the switch at the control station through a fixed movement, past a predetermined point, means controlled thereby to operate one of said similar switches while the switch at the control station moves to the predetermined point and for operating the second of the similar switches while the switch at the control station completes the fixed movement, means for sending a checking impulse only when both of said similar switches are off normal and in positions complementary to each other, means including a checking signal at said control station operated by said checking impulse to indicate that said similar switches are in complementary positions.

33. In a remote control system, a sender comprising a step by step switch, a selector comprising two step by step switches, banks on said selector switches, complementary connections between said banks, means for starting said sender to transmit a signal and to move a fixed distance, means operated by said sender to step the first of said selector switches until said signal is transmitted and to step the second selector switch throughout the remainder of said fixed movement, a checking means at said sender operated only if said selector switches are in positions complementary to each other, and a checking signal at said sender operated in response to the operation of said checking means to indicate that said selector switches are in complementary positions.

34. In a remote control system, a first station, a second station remote therefrom, devices at said second station, means at the first station for transmitting to the second station a series of impulses of constant number on each operation of said means, means at the first station for changing the character of at least one of said impulses in the series, the particular impulse being changed depending upon the particular device to be selected, selecting means at the second station, means whereby said selecting means is operated by each of said impulses in the series and is operated by the changed impulse to select the particular device corresponding to the particular changed impulse, checking means at said second station associated with the selecting means to totalize the received impulses, means operated by the checking means, on the selection of any device, in the event that the number of received impulses corresponds to said constant number for transmitting a single impulse to the first station and means at the first station responsive to said single impulse.

35. In a remote control system, a first station, a second station remote therefrom, devices at said second station, means at the first station for transmitting to the second station a series of impulses of constant number on each operation of said means, means at the first station for changing the character of at least one of said impulses in the series, the particular impulse being changed depending upon the particular device to be selected, selecting means at the second station, means whereby said selecting means is operated by each of said impulses in the series and is operated by the changed impulse to select the particular device corresponding to the particular changed impulse, checking means at said second station associated with the selecting means to totalize the received impulses, means operated by the checking means, on the selection of any device, in the event that the number of received impulses corresponds to said constant number for transmitting a single impulse to the first station and means at the first station responsive to said single impulse in the event that the impulse sender is then in the position it assumes at the end of the transmission of said constant number of impulses.

36. In a supervisory control system, a first station, a second station, a trunk line comprising three conductors connecting said stations, apparatus units at the second station, an operating circuit individual to each of said units, signalling devices at the first station corresponding to said units, means for transmitting a code of impulses over the first and second conductors of said line to the second station, means at the second station responsive to the code for selecting an operating circuit of an apparatus unit individual to said code, means responsive to said selection for preparing said selected operate circuit for control over the first and third conductors of said line and for transmitting an operating impulse from the second station over said first and second conductors of said line to the first station, means operated responsive to said impulse for indicating the selection of said prepared individual operate circuit, means for thereafter completing said operate circuit over said first and third conductors of said line to operate the apparatus unit, and means responsive to said operation for switching the first and second conductors of said line and for transmitting a code of impulses over the first and second conductors of said switched line to operate a signalling device individual to the operated unit.

37. In a supervisory control system, a first station, a second station, apparatus units at the second station, selecting mechanism at the second station for selecting one of said apparatus units at one time for operation, means at the first station for controlling the selecting operation of the selecting mechanism to select a particular unit, a checking circuit partially prepared by said first station means, means for completing said partially prepared checking circuit in response to the selection of said unit, means individual to said unit at said first station operated responsive to the completion of said circuit for identifying the unit selected, means at said second station also operated responsive to the completion of said circuit for preparing an operating circuit individual to the selected unit, and means at said first station for thereafter completing said prepared individual operating circuit to operate said unit.

38. In a remote control system, a first station, a second station, a transmitter at the second station, a receiver at the second station, a line comprising three conductors connecting said stations, the conductors of said line being normally connected to said receiver, apparatus units at the second station, said receiver being responsive to received code combinations of impulses transmitted over the first and second conductors of said line for selecting a predetermined one of said units, means for operating the selected unit over the first and third conductors of said line, means responsive to the operation of any one of said units for switching the first and second conductors of said line from said receiver to said transmitter, and said transmitter operating in response to the operation of any one of said units for transmitting coded impulses from said second station to said first station over the first and second conductors of said line to indicate the operated or non-operated condition of said units.

39. A remote control system comprising an office and a station, a plurality of devices at the station each capable of assuming different positions, a selecting apparatus at the station having access to the said devices, means at the office for transmitting codes of impulses to the station, said selecting apparatus responsive to specific codes of impulses so transmitted to select and change the position of a device, a control unit at the station also accessible to said selecting apparatus, said selecting apparatus responsive to a specific code of impulses different from that transmitted to select a device for selecting said control unit, and means responsive to the selection of said control unit for transmitting a single code of impulses to the office from the station, the impulses of said single code characteristic of the position of all of the devices in the station.

CHARLES REMINGTON.